(12) United States Patent
Shepelev et al.

(10) Patent No.: US 10,969,894 B2
(45) Date of Patent: Apr. 6, 2021

(54) METHOD AND SYSTEM FOR MEASURING A PHASE BASELINE ESTIMATE OF AN INPUT DEVICE

(71) Applicant: Synaptics Incorporated, San Jose, CA (US)

(72) Inventors: Petr Shepelev, Campbell, CA (US); Eric Bohannon, Rochester, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/745,649

(22) Filed: Jan. 17, 2020

(65) Prior Publication Data

US 2020/0150811 A1    May 14, 2020

Related U.S. Application Data

(63) Continuation of application No. 15/850,759, filed on Dec. 21, 2017, now Pat. No. 10,572,048.

(51) Int. Cl.
| | | |
|---|---|---|
| *G06F 3/044* | (2006.01) | |
| *G06F 3/0354* | (2013.01) | |
| *G06F 3/041* | (2006.01) | |
| *G06F 3/01* | (2006.01) | |

(52) U.S. Cl.
CPC ............ *G06F 3/0412* (2013.01); *G06F 3/044* (2013.01); *G06F 3/0446* (2019.05); *G06F 3/04166* (2019.05); *G06F 3/016* (2013.01); *G06F 3/03545* (2013.01); *G06F 2203/04112* (2013.01)

(58) Field of Classification Search
CPC .. G06F 3/0412; G06F 3/04166; G06F 3/0446; G06F 3/044; G06F 3/016; G06F 3/03545; G06F 2203/04112
See application file for complete search history.

(56) References Cited

U.S. PATENT DOCUMENTS

| | | | |
|---|---|---|---|
| 2013/0207906 A1* | 8/2013 | Yousefpor | G06F 3/0418 345/173 |
| 2017/0242534 A1* | 8/2017 | Gray | G06F 3/04166 |
| 2018/0081030 A1* | 3/2018 | McMahon | G01S 13/524 |

* cited by examiner

*Primary Examiner* — Robert J Michaud
(74) *Attorney, Agent, or Firm* — Ferguson Braswell Fraser Kubasta PC

(57) ABSTRACT

An input device may include various sensor electrodes that define various sensor pixels. The input device may further include a processing system coupled to the sensor electrodes. The processing system may obtain a first resulting signal and a second resulting signal from the sensor electrodes. The processing system may determine, using the first resulting signal, an in-phase estimate of a phase delay at a sensor pixel among the sensor pixels. The processing system may determine, using the second resulting signal, a quadrature estimate of the phase delay at the sensor pixel. The processing system may determine, based at least in part on the in-phase estimate and the quadrature estimate, a phase baseline estimate of the sensor pixels.

10 Claims, 10 Drawing Sheets

METHOD AND SYSTEM FOR MEASURING A PHASE BASELINE ESTIMATE OF AN INPUT DEVICE

CROSS REFERENCE TO RELATED APPLICATIONS

The present application is a continuation application of and, thereby, claims benefit under 35 U.S.C. § 120 to U.S. application Ser. No. 15/850,759, entitled, "METHOD AND SYSTEM FOR MEASURING A PHASE BASELINE ESTIMATE OF AN INPUT DEVICE," filed on Dec. 21, 2017, having the same inventors, and incorporated herein by reference.

FIELD

This disclosed technology generally relates to electronic devices and specifically to capacitive sensing devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Moreover, some proximity sensor devices use capacitive sensing with various sensor electrodes for scanning a sensing region. However, sensor electrodes include various electrical properties that may contribute delay in passing electrical signals through the sensor electrodes. Accordingly, many proximity sensing techniques may obtain proximity information without accounting and/or correcting for this delay caused within the sensor electrodes.

SUMMARY

In general, in one aspect, the disclosed technology relates to an input device. The input device includes various sensor electrodes that define various sensor pixels. The input device further includes a processing system coupled to the sensor electrodes. The processing system obtains a first resulting signal and a second resulting signal from the sensor electrodes. The processing system determines, using the first resulting signal, an in-phase estimate of a phase delay at a sensor pixel among the sensor pixels. The processing system determines, using the second resulting signal, a quadrature estimate of the phase delay at the sensor pixel. The processing system determines, based at least in part on the in-phase estimate and the quadrature estimate, a phase baseline estimate of the sensor pixels.

In general, in one aspect, the disclosed technology relates to a method. The input device includes various sensor electrodes that define various sensor pixels. The method includes obtaining a first resulting signal and a second resulting signal from various sensor electrodes that define various sensor pixels. The method further includes determining, using the first resulting signal, an in-phase estimate of a phase delay at a sensor pixel among the sensor pixels. The method further includes determining, using the second resulting signal, a quadrature estimate of the phase delay at the sensor pixel. The method further includes determining, based at least in part on the in-phase estimate and the quadrature estimate, a phase baseline estimate of the sensor pixels.

In general, in one aspect, the disclosed technology relates to an input device. The input device includes various transmitter electrodes. The input device further includes various receiver electrodes, where the transmitter electrodes and the receiver electrodes define various sensor pixels within the input device. The input device further includes a processing system coupled to the transmitter electrodes and the receiver electrodes. The processing system transmits a dither sensing signal along a transmitter electrode among the transmitter electrodes. The dither sensing signal includes a predetermined amount of phase noise that is produced according to a dither function. The processing system obtains a resulting signal from a receiver electrode among the receiver electrodes in response to transmitting the dither sensing signal. The processing system determines, using the resulting signal and the dither function, an in-phase estimate of a phase delay at a sensor pixel and a quadrature estimate of the phase delay at the sensor pixel. The processing system determines, based at least in part on the in-phase estimate and the quadrature estimate, a phase baseline estimate of the sensor pixels.

Other aspects of the disclosed technology will be apparent from the following description and the appended claims.

DETAILED DESCRIPTION

Figure 1:
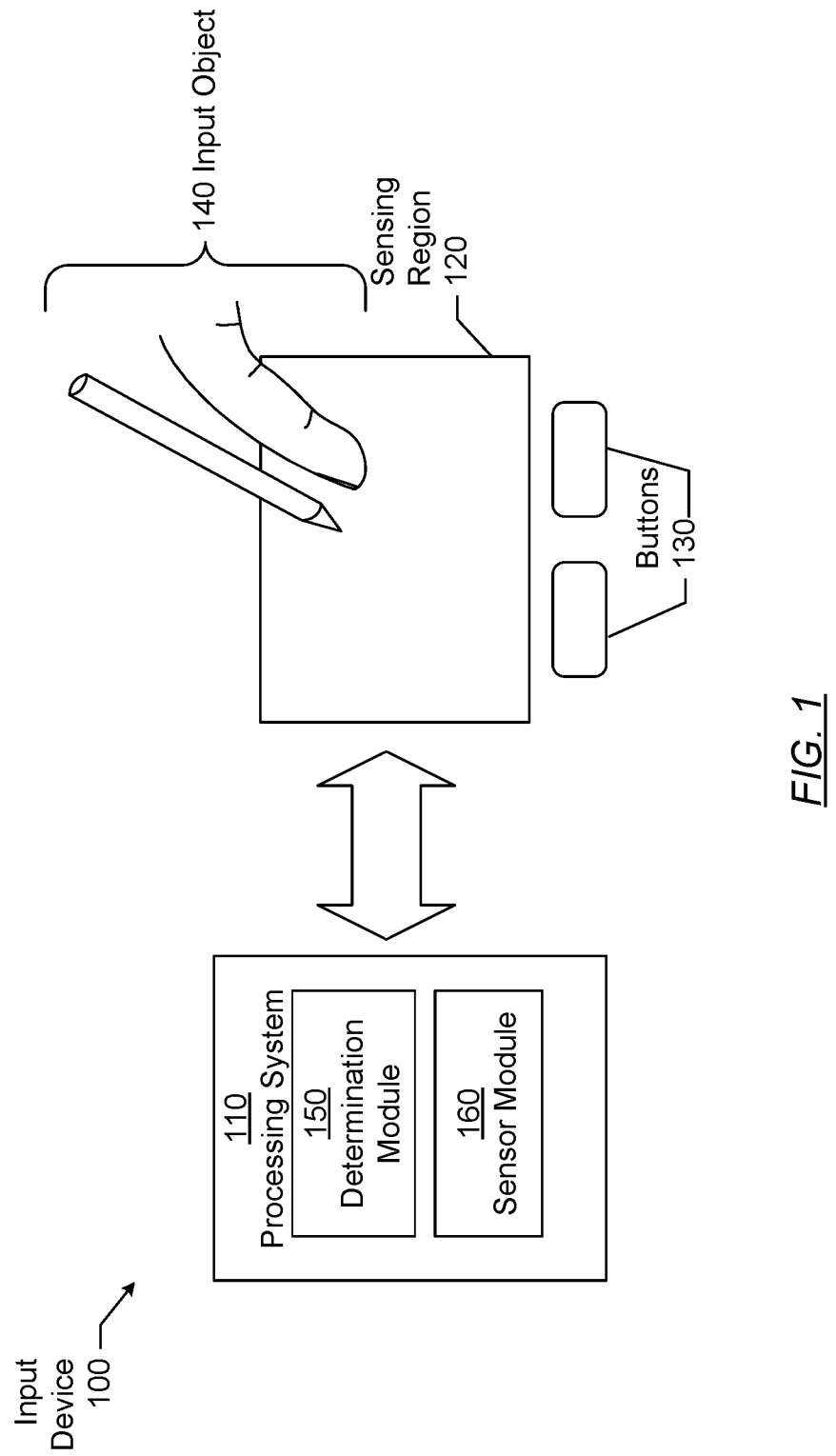
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology.

Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability. In particular, one or more embodiments of the disclosed technology are directed toward providing a method for determining and/or updating a phase baseline estimate of an input device. In particular, an input device may include a sensor electrode pattern with various sensor pixels. As such, a phase baseline may correspond to an amount of phase delay experienced by electrical signals passing through the sensor pixels. Likewise, the phase baseline may be a function of each sensor pixel's electrical properties, such as resistance (R), inductance (L), and capacitance (C). As the electrical properties of an input device change over time, the phase baseline may also change accordingly. Thus, during a capacitive scan of a sensing region, the phase delay at each sensor pixel may affect the detected amplitude of the capacitive scan.

In some embodiments, various resulting signals are analyzed to determine in-phase and quadrature components ("I/Q components") of the phase delay. Based on the I/Q components, the phase baseline of the input device may be estimated and monitored accordingly. In one or more embodiments, for example, the I/Q components are determined through circuitry involving mixers that isolate each respective component of the phase delay. In other embodiments, a dithering process is implemented by configuring sensing signals and detecting the I/Q components in the digital domain. Based on an up-to-date phase baseline estimate, object information may be determined accordingly.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). An example electronic system (or "electronic devices") may be a system capable of electronically processing information. Non-limiting examples of electronic systems include personal computing devices (e.g., desktop computers, laptop computers, netbook computers, tablets, web browsers, e-book readers, and personal digital assistants (PDAs), composite input devices (e.g., physical keyboards, joysticks, and key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the corresponding electronic system, or may be physically separated from the electronic system. The input device (100) may be coupled to (and communicate with) components of the electronic system using various wired and/or wireless interconnection and communication technologies, such as buses and networks. Example communication technologies may include Inter-Integrated Circuit ($I^2C$), Serial Peripheral Interface (SPI), PS/2, Universal Serial Bus (USB), Bluetooth®, Infrared Data Association (IrDA), and various radio frequency (RF) communication protocols defined by the IEEE 802.11 and other standards.

In FIG. 1, the input device (100) may correspond to a proximity sensor device (e.g., also referred to as a "touchpad" or a "touch sensor device") configured to sense input provided by one or more input objects (140) in a sensing region (120). Example input objects include fingers, styli, active pen, fingertips, and the like. Throughout the specification, the singular form of input object may be used although multiple input objects may exist in the sensing region (120). Further, the particular input objects in the sensing region may change over the course of one or more gestures.

The sensing region (120) encompasses any space above, around, in, and/or proximate to the input device (100) in which the input device (100) is able to detect user input (e.g., user input provided by one or more input objects (140)). The sizes, shapes, and locations of particular sensing regions may vary depending on actual implementation.

In some embodiments, the sensing region (120) may extend from a surface of the input device (100) in one or more directions into space until signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and the accuracy desired. In some embodiments, the sensing region (120) may detect inputs involving no physical contact with any surfaces of the input device (100), contact with an input surface (e.g., a touch surface and/or screen) of the input device (100), contact with an input surface of the input device (100) coupled with some amount of applied force or pressure, and/or a combination thereof. In some embodiments, input surfaces may be provided by, and/or projected on, one or more surfaces of a housing of the input device (100) (e.g., as an image). For example, the sensing region (120) may have a rectangular shape when projected onto an input surface of the input device (100). In some implementations, inputs may be provided through images that span one, two, three, or higher-dimensional spaces in the sensing region (120). In some implementations, inputs may be provided through projections along particular axes or planes in the sensing region (120). Further, in some implementations, inputs may be provided through a combination of one or more images and one or more projections in the sensing region (120).

The input device (100) may utilize any combination of sensor components and sensing technologies to detect user input in the sensing region (120). Example sensing technologies may include capacitive, elastive, resistive, inductive, magnetic, acoustic, ultrasonic, and/or optical sensing technologies.

In some embodiments, the input device (100) may utilize resistive sensing technologies to detect user inputs. For example, the sensing region (120) may be formed by a flexible and conductive first layer, separated by one or more spacer elements, from a conductive second layer. The sensing region (120) may detect user input by creating one or more voltage gradients are created across the layer, and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information about the detected inputs.

In some other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user inputs based on a combination of the magnitude, phase, and/or frequency of the currents. The characteristics of the loop currents may further be used to determine positional information about the detected inputs.

Still further, in some embodiments, the input device (100) may utilize capacitive sensing technologies to detect user inputs. For example, the sensing region (120) may include one or more capacitive sensing elements (e.g., sensor electrodes) to create an electric field. The input device (100) may detect inputs based on changes in capacitance of the sensor electrodes. For example, an object in contact with (or in close proximity to) the electric field may cause changes in the voltage and/or current in the sensor electrodes. Such changes in voltage and/or current may be detected as "signals" indicative of user inputs.

The sensor electrodes may be arranged in arrays or other configurations to detect inputs at multiple points within the sensing region (120). In some implementations, separate sensing electrodes may be ohmically shorted together to form larger sensor electrodes. Some capacitive implementations may utilize resistive sheets that provide a uniform layer of resistance.

Some capacitive implementations utilize "self capacitance" (or "absolute capacitance") sensing methods based on changes in the capacitive coupling between sensor electrodes and an input object. For example, an input object near the sensor electrodes may alter the electric field near the sensor electrodes, thus changing the measured capacitive coupling. In some embodiments, the input device (100) may implement absolute capacitance sensing by modulating sensor electrodes with respect to a reference voltage (e.g., system ground), and detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitance measurements.

Some capacitive implementations utilize "mutual capacitance" (or "transcapacitance") sensing methods based on changes in the capacitive coupling between sensor electrodes. For example, an input object near the sensor electrodes may alter the electric field between the sensor electrodes, thus changing the measured capacitive coupling. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to the receiver sensor electrodes. For example, the transmitter sensor electrodes may be modulated relative to a reference voltage to transmit signals, while the receiver sensor electrodes may be held at a substantially constant voltage to facilitate receipt of resulting signals. The resulting signal received by the receiver sensor electrodes may be affected by environmental interference (e.g., from other electromagnetic signals and/or objects in contact with, or in close proximity to, the sensor electrodes). In some aspects, each sensor electrode may be a dedicated transmitter, a dedicated receiver, or configured to both transmit and receive. Measurements acquired using mutual capacitance sensing methods may be referred to as mutual capacitance measurements.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) may include electronically-readable instructions, such as firmware code, software code, and/or the like. In some embodiments, components composing the processing system (110) are co-located, for example, in close proximity to the sensing element(s) of the input device (100). In other embodiments, one or more components of the processing system (110) are physically separate from the sensing element(s) of the input device (100). For example, the input device (100) may be a peripheral coupled to a computing device, and the processing system (110) may be implemented as software executed by a central processing unit (CPU) of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may be configured to determine when at least one input object is in a sensing region, determine signal to noise ratio, determine positional information of an input object, identify a gesture, determine an action to perform based on the gesture, a combination of gestures or other information, and/or perform other operations.

The sensor module (160) may be configured to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

The processing system (110) may include alternative or additional modules corresponding to distinct modules or sub-modules of one or more of the modules discussed above. For example, alternative or additional modules may include hardware operation modules configured to operate hardware such as sensor electrodes and display screens, data processing modules configured to process data such as sensor signals and positional information, reporting modules configured to report information, identification modules configured to identify gestures such as mode changing gestures, and mode changing modules configured to change operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

The processing system (110) may operate the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes and/or perform filtering or other signal conditioning on the received signals. In some embodiments, the processing system (110) may subtract or otherwise account for a baseline associated with the sensor electrodes. For example, the baseline may represent a state of the sensor electrodes when no user input is detected. Accordingly, the information provided by the processing system (110) to the electronic system may reflect a difference between the electrical signals received from the sensor electrodes and the baseline associated with each sensor electrode. In some embodiments, the processing system (110) may determine positional information for detected input, recognize inputs as commands, recognize handwriting, and the like.

The term "positional information" as used herein refers to any information describing other otherwise indicating a position or location of the detected input (e.g., within the sensing region (120)). Example positional information includes absolute position, relative position, velocity, acceleration, and/or other types of spatial information. The term "zero-dimensional" positional information may include how near/far an object is to the sensing region (120), or whether or not the object is in contact with the sensing region (120). The term "one-dimensional" positional information refers to information describing a position of the detected input along a particular axis. The term "two-dimensional" positional information refers to information describing a position or motion of the detected input in a plane. The term "three-dimensional" positional information refers to information describing a position, or instantaneous or average velocities of the detected input in space. Further examples of positional information may include other representations of spatial information, for example, historical data tracking position, movement, or instantaneous velocity of the detected input over time.

In some embodiments, the input device (100) includes a touch screen interface (e.g., display screen) that at least partially overlaps the sensing region (120). For example, the sensor electrodes of the input device (100) may form a substantially transparent overlay on the display screen, thereby providing a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, one or more of the sensor electrodes may be configured for both display updating and input sensing.

While FIG. 1 shows a configuration of components, other configurations may be used without departing from the scope of the disclosure. For example, various components may be combined to create a single component. As another example, the functionality performed by a single component may be performed by two or more components. Accordingly, for at least the above-recited reasons, embodiments of the disclosure should not be considered limited to the specific arrangements of components and/or elements shown in FIG. 1.

Figure 2A:
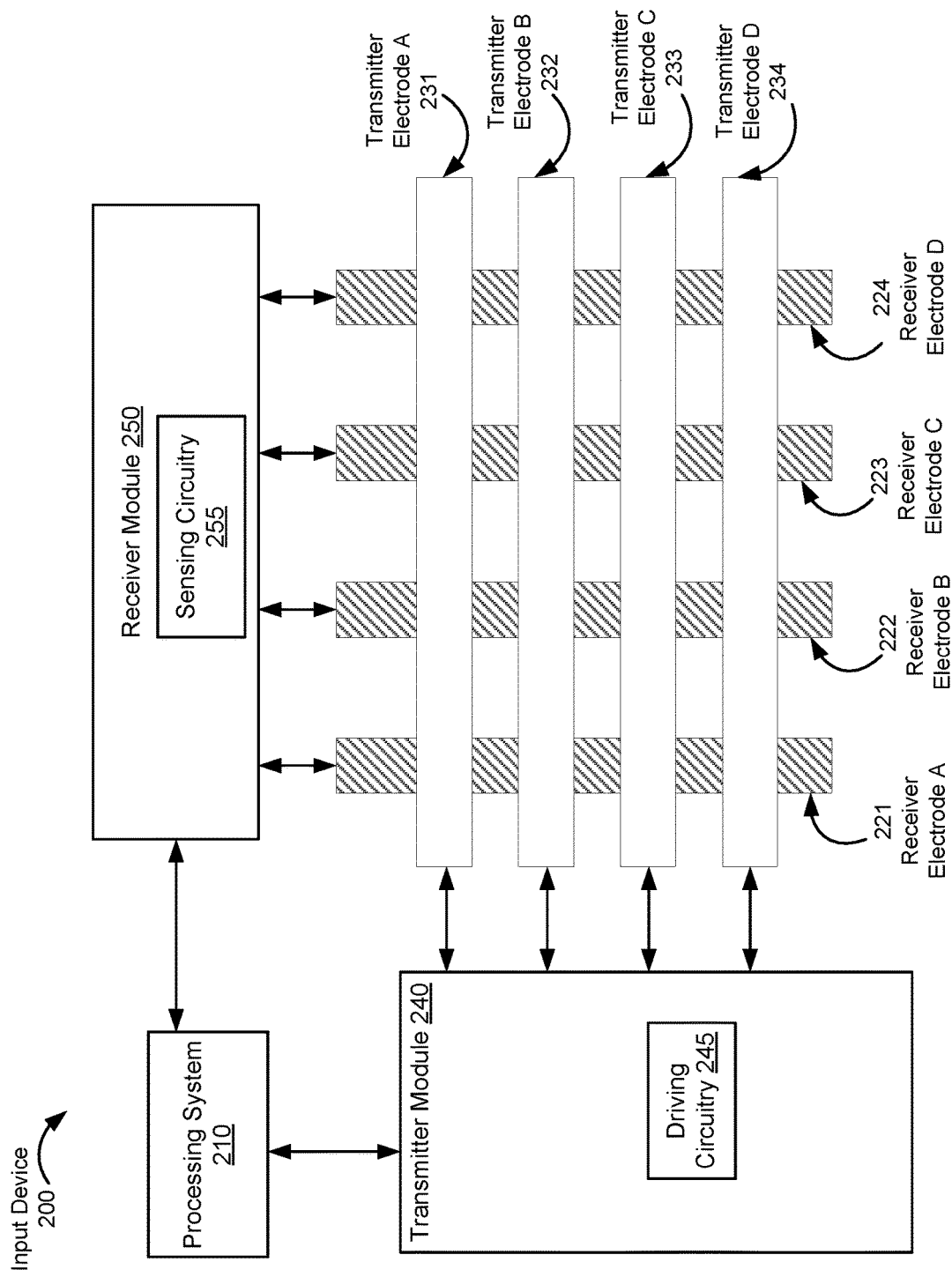
FIG. 2A shows a schematic view of an input device in accordance with one or more embodiments.

Turning to FIG. 2A, FIG. 2A shows a schematic view of an input device (200) in accordance with one or more embodiments. As shown in FIG. 2A, the input device (200) may include a receiver module (250), a transmitter module (240), and a processing system (210). The processing system (210) may be similar to processing system (110) described in FIG. 1 and the accompanying description and/or computing system (700) described in FIG. 7 and the accompanying description. The transmitter module (240) may include driving circuitry (245) that may be similar to transmitter circuitry described in FIG. 1 and the accompanying description. For example, driving circuitry (245) may include hardware and/or software that are configured to generate one or more sensing signals transmitted over one or more transmitter electrodes (e.g., transmitter electrode A (231), transmitter electrode B (232), transmitter electrode C (233), transmitter electrode D (234)). The transmitter electrodes (231, 232, 233, 234) may be similar to the transmitter electrodes described in FIG. 1 and the accompanying description.

Moreover, the receiver module (250) may include sensing circuitry (255). For example, sensing circuitry (255) may include hardware and/or software that are configured to obtain one or more resulting signals from one or more receiver electrodes (e.g., receiver electrode A (221), receiver electrode B (222), receiver electrode C (223), receiver electrode D (224)) in response to one or more sensing signals transmitted over the transmitter electrodes (231, 232, 233, 234). The sensing circuitry (255) may be similar to the receiver circuitry described in FIG. 1 and the accompanying description. In particular, the sensing circuitry (255) may include analog-front ends, which may further include various analog conditioning circuitry, such as operational amplifiers, digital-signal processing components, filters, and various application-specific integrated circuits for detecting and analyzing resulting signals obtained from the receiver electrodes (221, 222, 223, 224). Likewise, the receiver electrodes (221, 222, 223, 224) may be similar to the receiver electrodes described in FIG. 1 and the accompanying description.

Figure 2B:
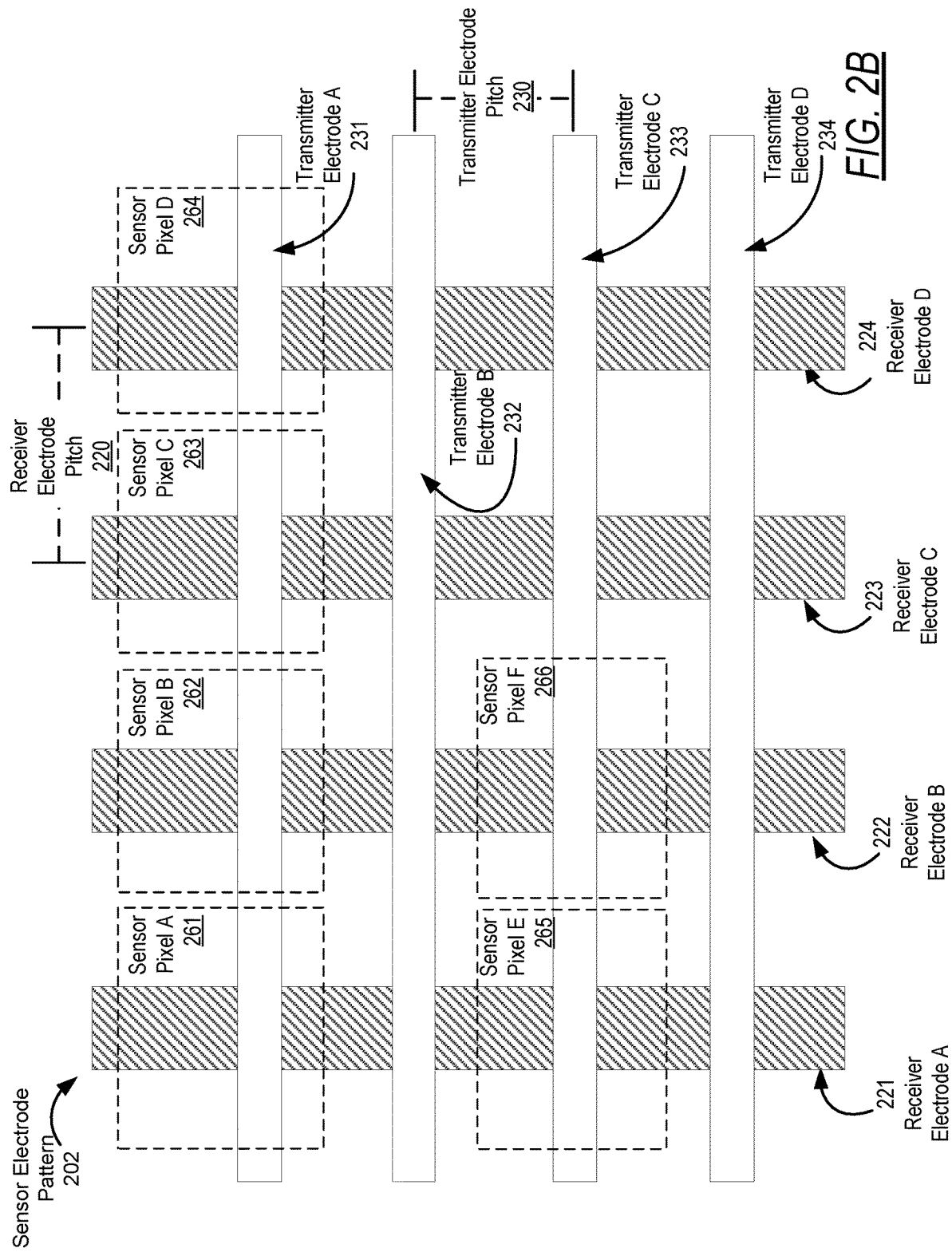
FIG. 2B shows a schematic view of a sensor electrode pattern in accordance with one or more embodiments.

Turning to FIG. 2B, FIG. 2B shows a schematic view of a sensor electrode pattern (202) in accordance with one or more embodiments. As shown in FIG. 2B, various sensor pixels (i.e., sensor pixel A (261), sensor pixel B (262), sensor pixel C (263), sensor pixel D (264), sensor pixel E (265), sensor pixel F (266)) are disposed in the sensor electrode pattern (202). In particular, a sensor pixel may be a portion of a sensor electrode pattern where a capacitive measurement is obtained, e.g., by sensing circuitry. For example, sensor pixels may be located at various intersections of receiver electrodes (e.g., receiver electrode A (221), receiver electrode B (222), receiver electrode C (223), receiver electrode D (224)) and transmitter electrodes (e.g., transmitter electrode A (231), transmitter electrode B (232), transmitter electrode C (233), transmitter electrode D (234)). In particular, the transmitter electrodes (231, 232, 233, 234) may be separated by a transmitter electrode pitch (230) that defines a particular spacing between respective transmitter electrodes. Likewise, the receiver electrodes (221, 222, 223, 224) may be separated by a receiver electrode pitch (220) that defines a particular spacing between respective transmitter electrodes. However, other embodiments are contemplated where sensor pixels do not correspond to intersections of transmitter electrodes and receiver electrodes.

Figure 2C:
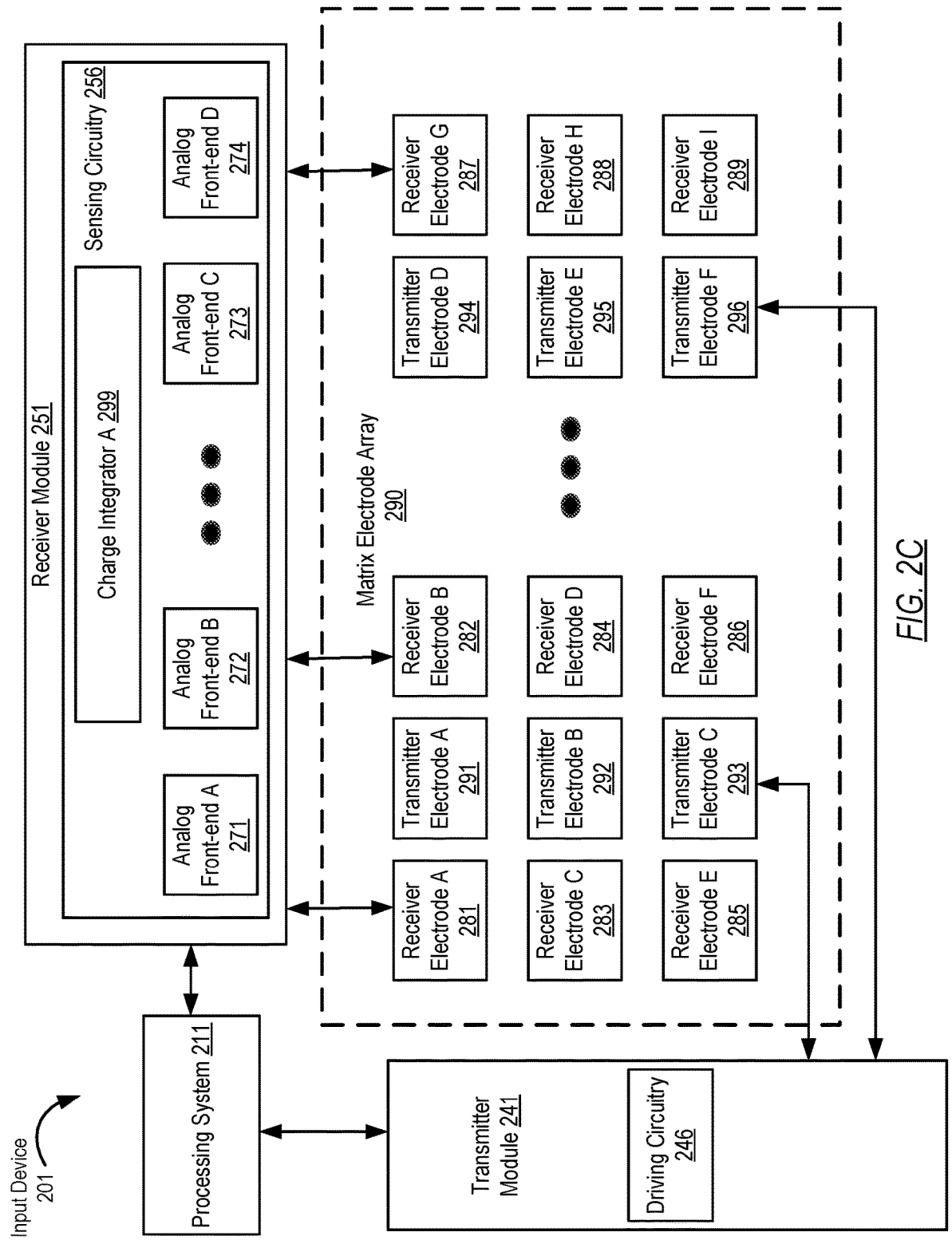
FIG. 2C shows a schematic view of an input device in accordance with one or more embodiments.

Turning to FIG. 2C, FIG. 2C shows a schematic view of an input device (201) in accordance with one or more embodiments. As shown in FIG. 2C, the input device (201) may include a receiver module (251), a transmitter module (241), and a processing system (211). The processing system (211) may be similar to processing system (110) described in FIG. 1 and the accompanying description and/or the computing system (700) described in FIG. 7 and the accompanying description. The transmitter module (241) may be similar to the transmitter module (240) described in FIG. 2A and include driving circuitry (246) that may be similar to transmitter circuitry described in FIG. 1 and the accompanying description. Likewise, the driving circuitry (246) may include hardware and/or software that includes functionality to generate one or more sensing signals transmitted over one or more transmitter electrodes (e.g., transmitter electrode A (291), transmitter electrode B (292), transmitter electrode C (293), transmitter electrode D (294), transmitter electrode E (295), transmitter electrode F (296)). The transmitter electrodes (291, 292, 293, 294, 295, 296) may be similar to the transmitter electrodes described in FIGS. 1, 2A, and 2B and the accompanying description. Likewise, various routing traces (not shown), such as gate lines and source lines, may couple driving circuitry (246) with the transmitter electrodes (291, 292, 293, 294, 295, 296).

Moreover, the receiver module (251) may include sensing circuitry (256). For example, sensing circuitry (256) may include hardware and/or software that includes functionality to obtain one or more resulting signals from one or more receiver electrodes (e.g., receiver electrode A (281), receiver electrode B (282), receiver electrode C (283), receiver electrode D (284), receiver electrode E (285), receiver electrode F (286), receiver electrode G (287), receiver electrode H (288), receiver electrode I (289)) in response to one or more sensing signals transmitted over the transmitter electrodes (291, 292, 293, 294, 295, 296). The sensing circuitry (256) may also include various analog front-ends (e.g., analog front-end A (271), analog front-end B (272), analog front-end C (273), analog front-end D (274)). The sensing circuitry (256) may be similar to the receiver circuitry described in FIG. 1 and/or the sensing circuitry (255) described in FIG. 2A and the accompanying description.

In one or more embodiments, the input device (201) includes a matrix electrode array (e.g., matrix electrode array (290)). For example, the matrix electrode array (290) may include the transmitter electrodes (291, 292, 293, 294, 295, 296) and the receiver electrodes (281, 282, 283, 284, 285, 286, 287, 288, 289) disposed according to a predetermined shape, such as a square, rectangle, circle, regular and irregular shapes, and/or other geometric shapes. Within the matrix electrode array (290), receiver electrodes and transmitter electrodes may alternate in rows and/or columns to form a predetermined pattern, e.g., receiver electrode then transmitter electrode, two receiver electrodes then one transmitter electrode, etc. In some embodiments, individual receiver electrodes in the matrix electrode array (290) correspond to respective sensor pixels in the input device (201).

Continuing with FIG. 2C, the sensing circuitry (256) may include one or more charge integrators (e.g., charge integrator A (299)). In particular, a charge integrator may include hardware and/or software that includes functionality for transforming one or more resulting signals into a voltage output proportional a respective resulting signal. For example, a charge integrator may include an amplifier with an input terminal and a reference terminal that is configured in a similar manner as described above with respect to the input terminal and reference terminal of the analog front-end. Thus, charge integrator A (299) may include one or more amplifiers, various feedback capacitors, and other circuit components.

The sensing circuitry (256) may further include one or more current conveyors. For example, a current conveyor may include hardware and/or software for replicating a resulting signal and/or an approximation of a resulting signal. A current conveyor may also be configured according to one or more modes describes above with respect to the various types of analog front-ends.

Figure 3A:
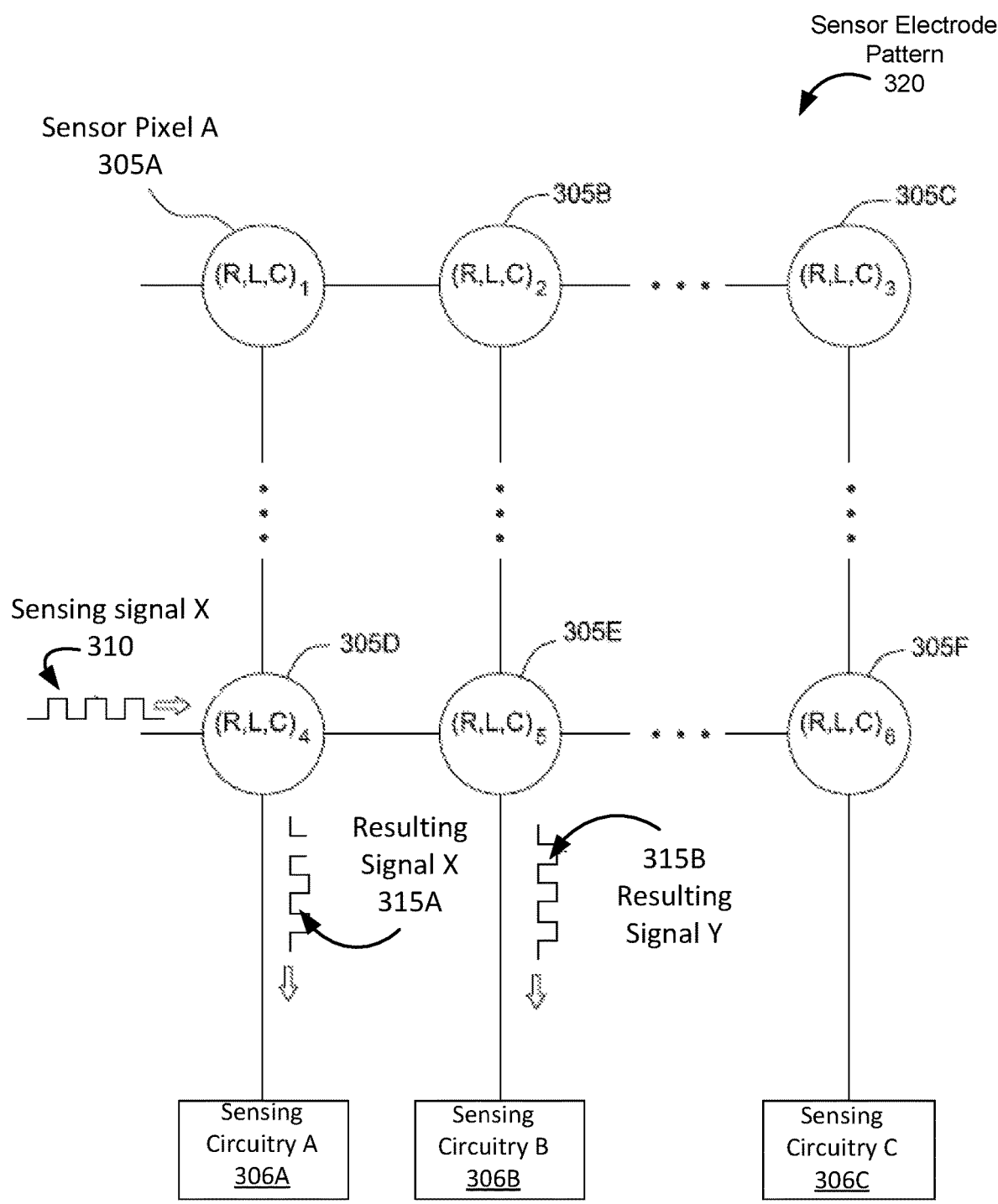
FIG. 3A illustrates an impedance network for a sensor electrode pattern of an input device in accordance with one or more embodiments.

Turning to FIG. 3A, FIG. 3A illustrates an impedance network for a sensor electrode pattern (320) of an input device in accordance with one or more embodiments. As shown, the sensor electrode pattern (320) includes various sensor pixels (e.g., sensor pixel A (305A)) represented as a node network where resistive (R), inductive (L), and capacitive (C) values are nodal parameters of individual nodes in the node network. The sensor electrode pattern (320) may take on any shape—rectangular, diamond, circular, etc., such as the grid pattern shown above in FIG. 2B or the matrix electrode array pattern shown above in FIG. 2C. Moreover, the sensor electrode pattern (320) includes various sensor pixels (305) which may be defined by the shape and location of respective sensor electrodes in the sensor electrode pattern (320). Each sensor pixel (305) may have different resistive, inductive, and capacitive (R, L, C) values than each of the other sensor pixels (305) in the sensor electrode pattern (320).

Keeping with FIG. 3A, a sensing signal X (310) may affect nodes within the sensor electrode pattern (320) which results in a resulting signal X (315A) and a resulting signal Y (315B). Stated differently, the resulting signal X (315A) comprises effects of driving the modulated sensing signal X (310) onto one or more of the sensor electrodes in the sensor electrode pattern (320). If performing transcapacitance sensing, the sensing signal X (310) is driven onto a first sensor electrode and in response generates the resulting signal X (315A) onto a second sensor electrode that is capacitively coupled to the first sensor electrode. For example, the sensing signal X (310) may be a transmitter signal driven on a transmitter electrode on a first layer in the input device.

However, if performing absolute capacitive sensing, the sensing signal X (310) may be applied by sensing circuitry (e.g., sensing circuitry A (306A), sensing circuitry B (306B), and sensing circuitry C (306C), such as at a terminal to a charge integrator) which modulates the sensor electrode and enables the sensing circuitry to measure the resulting signal X (315A) corresponding to that sensor electrode. FIG. 3A is drawn generically to illustrate the effects of the R, L, C network when performing either transcapacitive or absolute capacitive sensing.

Each sensor pixel (305) has a shape defined by an outline of a sensor electrode where the sensing circuitry may measure an individual measurement of capacitance at a particular location in space in order to calculate a location of one or more input objects. For example, the sensor pixels (305) may be defined by a crossing between a transmitter electrode and a receiver electrode or a physical outline of sensor electrode used for absolute capacitance sensing. Because the R, L, and C values for each sensor pixel (305) may be different, this means the relative phase offset between the sensing signal X (310) and the resulting signal X (315A) may be different. That is, the values of R, L, C at each sensor pixel (305) may alter the phase and amplitude for each resulting signal relative to the respective sensing signals.

Figure 3B:
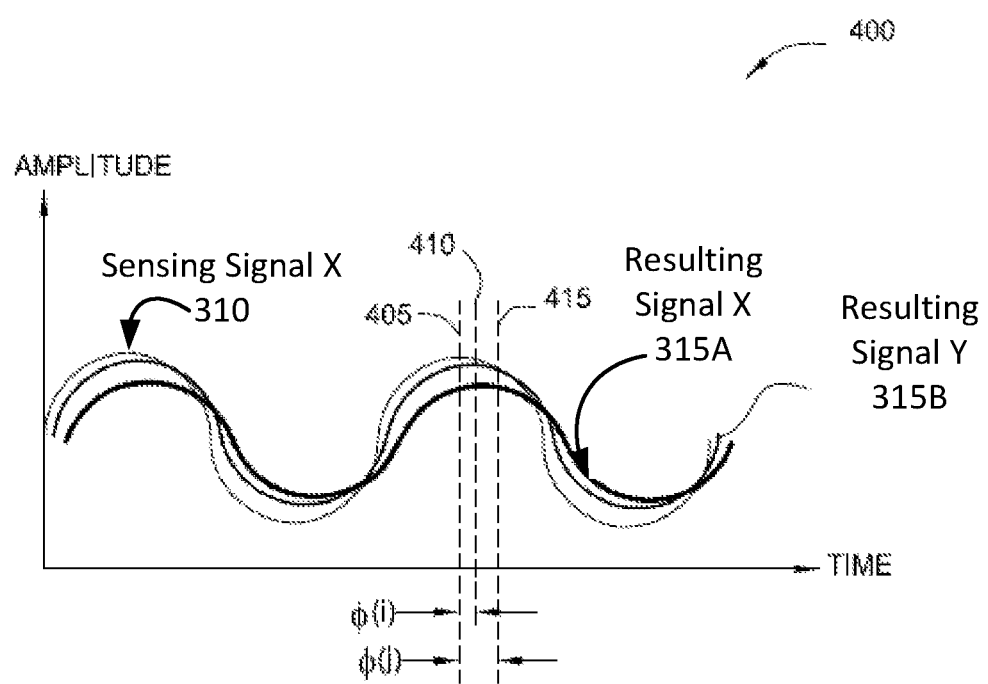
FIG. 3B illustrates phase offset between a sensing signal and resulting signals in accordance with one or more embodiments.

Turning to FIG. 3B, FIG. 3B illustrates phase offset between the sensing signal X (310) and resulting signal X (315A) and resulting signal Y (315B) in accordance with an embodiment described herein. Chart (400) illustrates the phase offset $\phi$ between two resulting signals (315A, 315B) generated at two different sensor pixels (305) shown in FIG. 3A. In this example, the same sensing signal X (310) is used to generate the two resulting signals (315A) and (315B). Because the R, L, and C values for the two sensor pixels (305) are different, the respective phase offset between the resulting signals (315A, 315B) and the sensing signal X (310) is different.

The dotted vertical line (405) illustrates the positive peak of the sensing signal X (310) while line (410) and line (415) illustrate the positive peaks of resulting signals (315A, 315B), respectively. As shown, the resulting signals (315A, 315B) have a similar shape as the sensing signal X (310) but with different amplitudes and phase delays. The sensing circuitry (306) shown in FIG. 3A sample different points of the resulting signals (315A, 315B) to generate capacitive sensing measurements. However, where the sensing circuitry (306) sample the resulting signals (315A, 315B) may affect the amount of signal measured. For example, if the sensing circuitry (306) samples the resulting signals (315A, 315B) at the time illustrated by line (405), the resulting signals (315A, 315B) are not at their peaks, and thus, the amount of signal measured is less than what would be measured during the times corresponding to the lines (410, 415) when the resulting signals (315A, 315B) are at their peaks.

Chart (400) illustrates that different sensor pixels 305 may have different phase offsets relative to the sensing signal X (310). For example, the sensing signal X (310) may be driven on one transmitter electrode which then results in the resulting signals (315A, 315B) on two receiver electrodes. Because the receiver electrodes may have different R, L, C values, the phase offset for the resulting signals (315A, 315B) relative to the sensing signal X (310) are different. Further, the R, L, C values for the sensor pixels (305) may change or drift based on, for example, temperature fluctuations. Ideally, sensing circuitry may identify the phase offset and sample when the resulting signals (315A, 315B) are at their local maximum and minimum.

Figure 4:
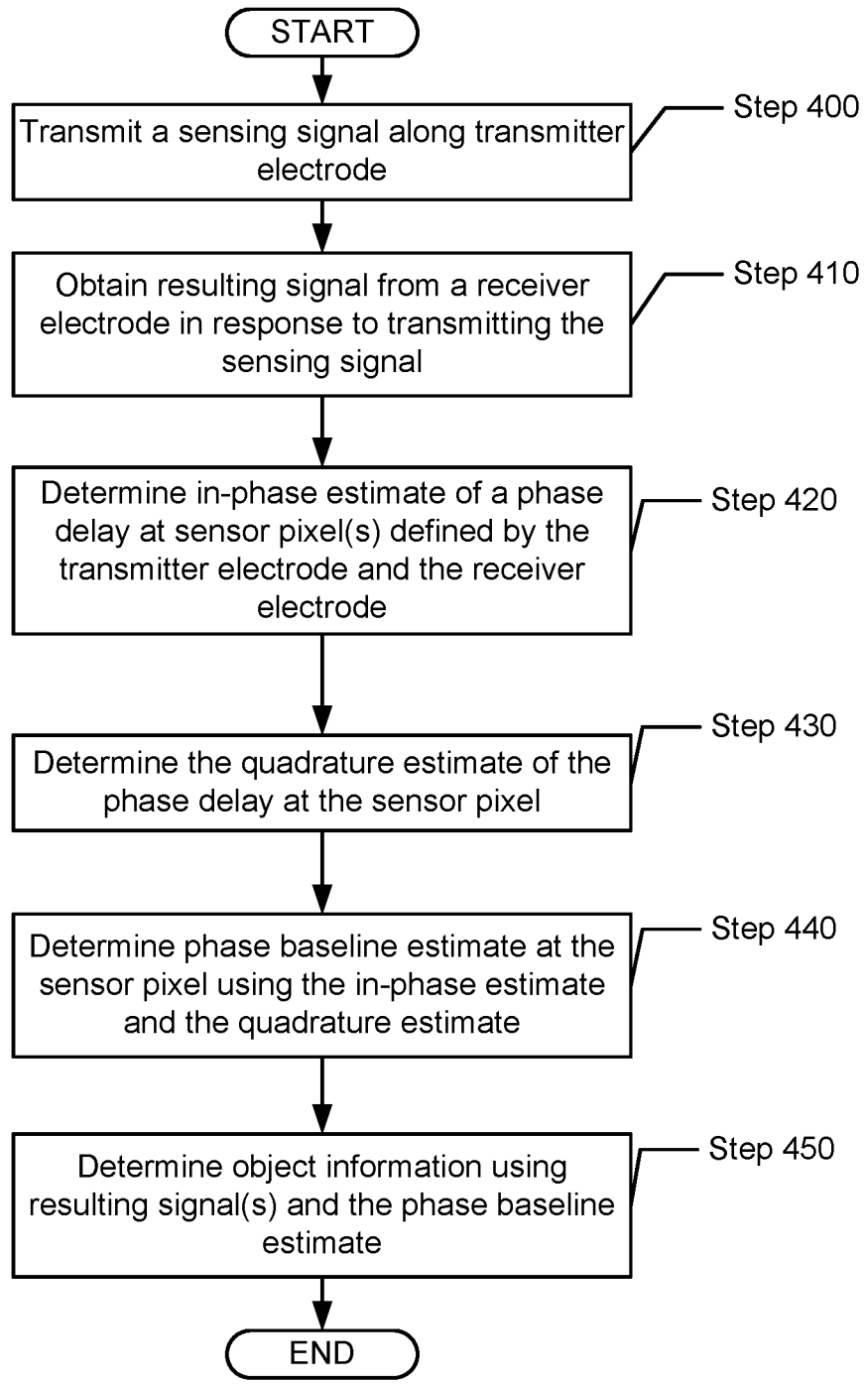
FIG. 4 shows a flowchart in accordance with one or more embodiments.

Turning to FIG. 4, FIG. 4 shows a flowchart in accordance with one or more embodiments. Specifically, FIG. 4 describes a method for estimating a phase baseline within an input device. The process shown in FIG. 4 may involve, for example, one or more components discussed above in reference to FIGS. 1, 2A, 2B, 2C, and 3A (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a sensing signal is transmitted along a transmitter electrode in accordance with one or more embodiments. In particular, the sensing signal may be a modulated signal that is driven by driving circuitry in an input device. In some embodiments, the sensing signal is a continuous sensing signal. For example, a continuous sensing signal may not include a reset interval between transmitting sensing signals. In particular, a reset interval may be a settling period within a capacitive sensing sequence where sensor electrodes may return to a reference voltage before the next sensing signal is transmitted. In one or more embodiments, for example, the transmitter electrode is similar to the transmitter electrodes described in FIGS. 1, 2A, 2B, 2C, and 3A and the accompanying description.

In Step 410, a resulting signal is obtained from a receiver electrode in response to transmitting a sensing signal in accordance with one or more embodiments. For example, the resulting signal may correspond to effects of a variable capacitance between the transmitter electrode and the receiver electrode. On the other hand, the resulting signal may also be configured to measure changes in absolute capacitance between the receiver electrode and one or more input objects in a sensing region of an input device. Thus, the resulting signal may be part of a transcapacitive scan or an absolute capacitive scan. Likewise, in some embodiments, the resulting signal is a modulated signal obtained in response to the sensing signal transmitted over Step 400. The receiver electrode may be similar to the receiver electrodes described in FIGS. 1, 2A, 2B, 2C, and 3A, and the accompanying description.

In some embodiments, where the transmitted sensing signal is continuously transmitted, the resulting signal is continuously sampled by a processing system. In other words, as no reset interval may exist between frames within a capacitive sensing sequence, the processing system may continually obtain capacitive measurements during the capacitive sensing sequence.

In Step 420, an in-phase estimate of a phase delay is determined at one or more sensor pixels in accordance with one or more embodiments. In particular, an input device may determine an amount of phase delay produced at a sensor pixel when a sensing signal and/or resulting signal traverses the corresponding sensor pixel. For example, various sensor pixels in a sensor electrode pattern may correspond to a node network. For each node i in the node network, an amplitude A(i) and a phase φ(i) of a signal waveform may be continuously sampled by a processing system. Thus, the node network may define various transmission lines among the sensor pixels. The node network may correspond to a tensor that defines various nodal parameters corresponding to sensor pixels within a sensor electrode pattern. For example, the nodal parameters of a tensor may correspond to the R, L, and C values described in FIGS. 3A and 3B above in regard to the sensor electrode pattern (320). Thus, the tensor may transform a phase baseline B of the sensor electrode pattern to B̂ into a different coordinate system of a lower dimension that defines one or more effects of the sensor electrode pattern on a particular signal, e.g., by adjusting the amplitude and phase of a resulting signal waveform detected by an analog front-end. Different tensors may correspond to different sensor electrode patterns, e.g., bars-stripe sensors, matrix electrode arrays, circular sensors, etc.

Moreover, the node network may describe changes among various sensing signal waveforms and resulting signal waveforms within the input device. In some embodiments, for example, a sensor pixel corresponds to an intersection between a transmitter electrode and a receiver electrode. Likewise, the sensor pixels may be similar to the sensor pixels described above in FIGS. 2B and 2C and the accompanying description.

Furthermore, the phase delay at a sensor pixel may be divided into an in-phase component and a quadrature component (also called "I/Q components"). In Step 420, the in-phase estimate of a phase delay may be determined, while in Step 430 below, a quadrature estimate of the phase delay may be determined. In some embodiments, in-phase components and quadrature components are determined substantially simultaneously, e.g., using a dithering process. In some embodiments, an input device performs a dithering process in connection with a capacitive scan to determine the I/Q components of the phase delay.

Figure 5:
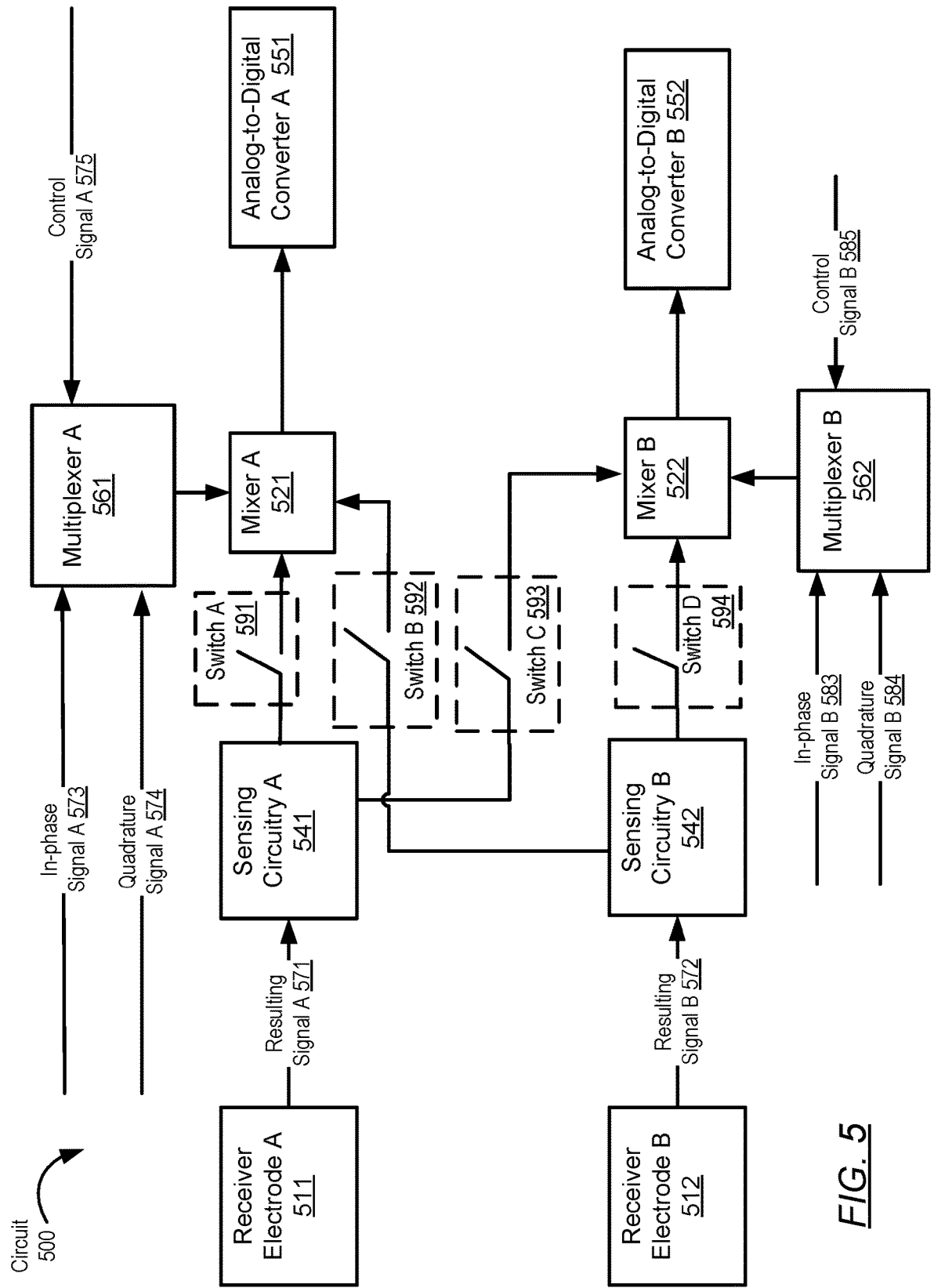
FIG. 5 shows an example in accordance with one or more embodiments.

Turning to FIG. 5, FIG. 5 illustrates a schematic circuit diagram in accordance with one or more embodiments. In particular, FIG. 5 shows a circuit (500) for determining I/Q components of a phase delay. For example, the circuit (500) may include various receiver electrodes (e.g., receiver electrode A (511), receiver electrode B (512), sensing circuitries (e.g., sensing circuitry A (541), sensing circuitry B (542)), various mixers (e.g., mixer A (521), mixer B (522)), various multiplexers (e.g., multiplexer A (561), multiplexer B (562)), and various analog-to-digital (AD) converters (e.g., AD converter A (551), AD converter B (552)). The receiver electrodes (511, 512) may be similar to the receiver electrodes described above in FIGS. 1, 2A, 2B, and 2C. As shown in FIG. 5, a resulting signal A (571) is obtained by sensing circuitry A (541), and a resulting signal B (572) is obtained sensing circuitry B (542). Specifically, the circuit (500) may further include various switches (e.g., switch A (591), switch B (592), switch C (593), switch D (594)) that configure the circuit (500) for determining the in-phase estimate and/or the quadrature estimate of the phase delay. Likewise, a processing system (not shown) may control the multiplexers (561, 562) and/or the switches (591, 592, 593, 594) using one or more control signals (e.g., control signal A (575), control signal B (585)). A control signal may be a digital electrical signal configured to select a device output using a '0' state or a '1' state, for example.

Keeping with FIG. 5, in a capacitive sensing state where switch A (591)=1, switch B (592)=0, switch C (593)=0, switch D (594)=1, control signal A (575)=1, and control signal B (585)=1 (i.e., where '1' designates an 'ON' or 'closed' state and a '0' designates an 'OFF' or 'open' state), the circuit (500) may only analyze the resulting signals (571, 572) for object information relating to one or more input objects within a sensing region. During a phase detection state for receiver electrode A (511), switch A (591)=1, switch B (592)=0, switch C (593)=1, switch D (594)=0, control signal A (575)=1, and control signal B (585)=0. In this state, resulting signal A (571) is transmitted to mixer A (521) and mixer B (522), which are driven by quadrature signal A (574) and in-phase signal B (583), respectively. From the mixers (521, 522), the quadrature component of the resulting signal A (571) is transmitted to AD converter A (551) and the in-phase component of resulting signal A (571) is transmitted AD converter B (552), respectively. Thus, the in-phase component and the quadrature component of the resulting signal A (571) are determined accordingly. For example, signals obtained from the mixers (521, 522) may be combined in the digital domain to determine the magnitude and phase of a complex number represented by a sum of the signals being transmitted from the mixers (521, 522).

During a phase detection state of receiver electrode B (512), switch A (591)=0, switch B (592)=1, switch C (593)=0, switch D (594)=1, control signal A (575)=0, and control signal B (585)=1. In this state, resulting signal B (572) is transmitted to both mixers (521, 522), which are driven by mixing signals. The result of the mixers (521, 522) are transmitted to AD converter A (551) and AD converter B (552), respectively, such that a phase baseline of receiver electrode B (512) may be calculated by a processing system (not shown). The circuit (500) shown in FIG. 5 may provide for shared hardware for implementing the phase baseline detection for multiple receiver electrodes. For example, when determining the phase baseline estimate, the resulting signal A (571) may be transmitted to the mixer B (522) and AD converter B (552), while also being transmitted to mixer A (521) and AD converter A (551). While two sets of receiver electrodes and associated circuitry are shown in FIG. 5, in other embodiments, three or more sets of associated circuitry and/or receiver electrodes are included for phase baseline detection of a sensor electrode pattern.

Returning to FIG. 4, in Step 430, a quadrature estimate of a phase delay is determined at one or more sensor pixels in accordance with one or more embodiments Similar to Step 420, a processing system may analyze one or more resulting signals to determine a quadrature component of a phase delay produced by a sensor electrode pattern. For example, the circuit (500) described above in FIG. 5 may be used to determine the quadrature estimate of the phase delay. Likewise, in some embodiments, a dithering processing is used to determine the quadrature estimate. For more information on using the dithering process, see FIG. 6 below and the accompanying description.

In Step 440, a phase baseline estimate is determined at one or more sensor pixels using an in-phase estimate and a quadrature estimate in accordance with one or more embodiments. In particular, a processing system may use the estimated I/Q components to determine a phase baseline estimate for various sensor pixels in an input device. For example, the phase baseline estimate may be a matrix or array of different phase values for respective pixels in a sensor electrode pattern. Likewise, the phase baseline estimate may correspond to respective sensor electrodes, e.g., a particular phase delay may be associated with resulting signals from a particular receiver electrode. Once determined, the processing system may store and/or update the phase baseline estimate in the input device. Thus, the processing system may readily access a history of previous phase baseline estimate for analyzing the current phase baseline of an input device.

Furthermore, a processing system may use the phase baseline estimate to adjust one or more resulting signals to produce adjusted resulting signals. For example, various factors, such as temperature changes to an input device, dielectric constants changes produced by expansions and/or contractions between conductors in an input device may contribute to changes in a phase baseline of an input device. Thus, the phase baseline may be track in order to eliminate from the factors from capacitive scans to obtain signal directed to the presence of one or more input objects. By assuming that phase baseline factors are additive in resulting signal, an input device may subsequently subtract the phase baseline estimate to isolate input object signals within a capacitive response. In some embodiments, for example, a processing system monitors a phase baseline to provide amplitude compensation to resulting signals in a capacitive scan. As such, using in-phase and quadrature estimates, the phase baseline may be estimated for application to sensing circuitry, such as an AFE sampling configuration.

In some embodiments, a processing system adjusts the transmission of one or more sensing signals based on a phase baseline estimate. For example, where a sensing signal is a continuous signal, e.g., without a reset interval, a processing system may delay and/or advance the sensing signal transmission in Step 400 and/or obtaining of the resulting signals in Step 410 to account for delay within a sensor electrode pattern described by the phase baseline estimate. Moreover, as the phase baseline estimate changes over time, the processing system may adjust various sensing signal parameters, such as transmission frequency, to account for the changing phase baseline estimate.

Furthermore, where no reset interval is used in a capacitive sensing sequence, a temporal mismatch may occur over time between transmitted sensing signals and measuring/analyzing resulting signals. As such, object information determined from the resulting signals may prove inaccurate with respect to one or more input objects in a sensing region. Thus, in some embodiments, a processing system determines a phase estimate to model a portion of the phase delay within the sensor electrode. In some embodiments, for example, the processing system updates a previous phase estimate of the phase baseline based on the current detected phase estimate.

Returning to FIG. 5, the circuit (500) may determine a phase baseline estimate in a matrix electrode array implementation. In particular, a processing system in an input device with a matrix electrode array may include a large amount of analog front-ends (AFE) where a relatively increased amount of frame time in the capacitive sensing sequence may be used for capacitive sensing. Thus, the increased frame time may be used to determine and/or update a phase baseline estimate. For example, where an input device includes 576 sensor electrodes and a processing system with 576 AFEs, 2 millisecond (ms) of touch frame time may be used to detect input objects. Ignoring noise bursts, the touch frame time may be divided into two 1 ms bursts. Using circuit (500), the first 1 ms burst may be used to determine a phase baseline estimate of the first 288 sensor electrodes. The second 1 ms burst may be used to determine the phase baseline estimate of the second 288 electrodes. Likewise, the technique shown in FIG. 5 may not require a per-pixel mixing clock. In some embodiments, circuit (500) is modified to determine upper and lower sidebands of in-phase and quadrature components obtained from various resulting signals.

Returning to FIG. 4, in Step 450, object information is determined using one or more resulting signals and a phase baseline estimate in accordance with one or more embodiments. A processing system may use adjusted resulting signal amplitudes based on the phase baseline estimate to determine the object information. For example, object information may include positional information similar to the positional information described in FIG. 1 and the accompanying description. Object information may also include various characteristics of an input object, such as input object size and/or the type of input object, e.g., whether an input object is an index finger, a palm, a user's face, stylus, etc. As such, a processing system may compare values obtained from the resulting signals with templates and/or threshold values to determine the object information. The object information may be further reported to a host device coupled to the processing system according to a reporting interval in a capacitive sensing sequence.

Figure 6:
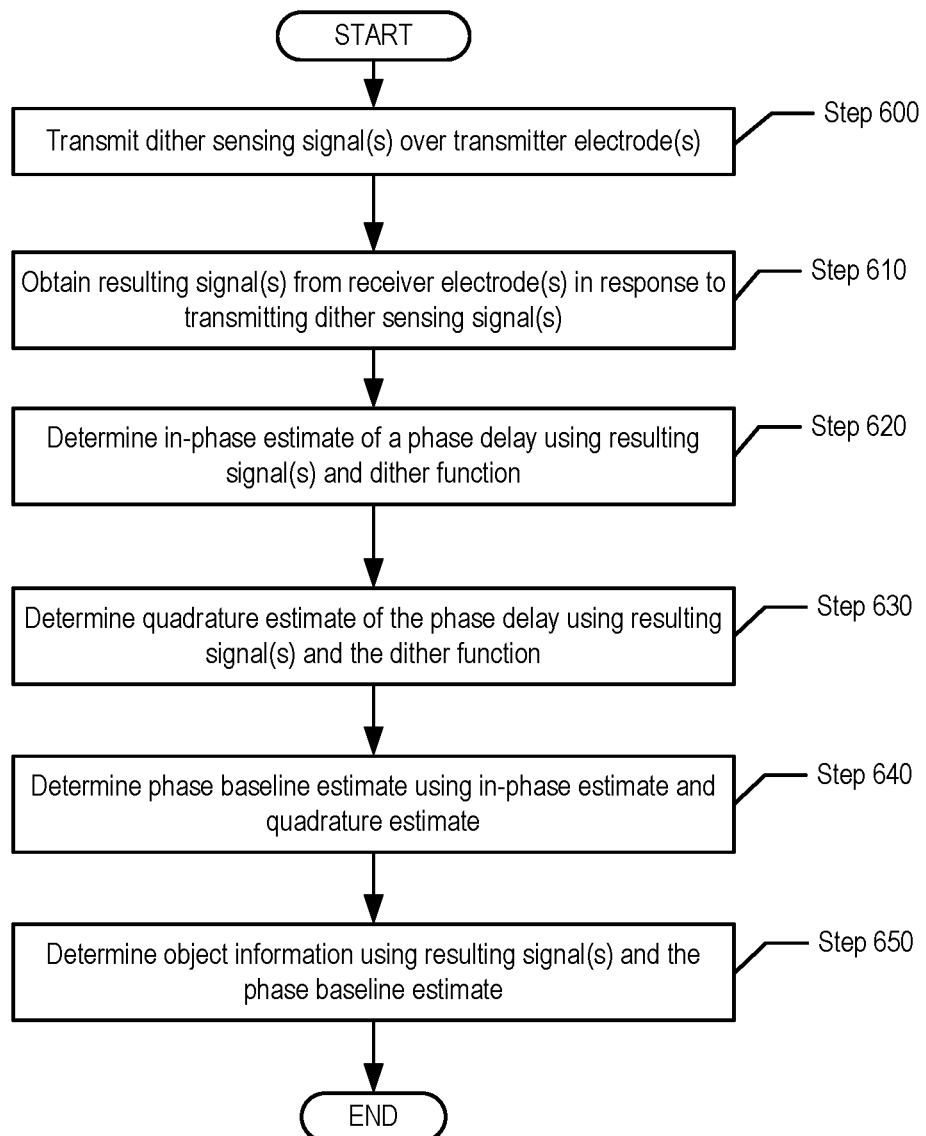
FIG. 6 shows a flowchart in accordance with one or more embodiments.

Turning to FIG. 6, FIG. 6 shows a flowchart in accordance with one or more embodiments. Specifically, FIG. 6 describes a method for operating an input device. The process shown in FIG. 6 may involve, for example, one or more components discussed above in reference to FIGS. 1, 2A, 2B, and 2C (e.g., processing system (110)). While the various steps in FIG. 6 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 600, one or more dither sensing signals are transmitted over one or more transmitter electrodes in accordance with one or more embodiments. In some embodiments, a phase delay is tracked iteratively using a dithering process. A dithering process may be implemented using a processing system and/or hardware to track a phase delay by implementing a dither function within a sensing signal, i.e., by transmitting a dither sensing signal. For example, a dithering process may introduce a dithering term based on a dither function $\epsilon_i(t)$ into one or more sensing signals during a capacitive scan.

In some embodiments, a dithering process is used where in-phase measurements and/or quadrature measurements are not supported by input device hardware. Likewise, a dithering process may overcome various latency issues that prevent in-phase measurements and/or quadrature measurements from being obtained from time-sequential signals.

In Step 610, one or more resulting signals are obtained from one or more receiver electrodes in response to one or more dither sensing signals in accordance with one or more embodiments. In one or more embodiments, for example, the receiver electrodes are similar to the receiver electrodes described in FIGS. 1, 2A, 2B, and 2C and the accompanying description.

In Step 620, an in-phase estimate of a phase delay is determined using one or more resulting signals and a dither function in accordance with one or more embodiments. In particular, a processing system may compute the in-phase estimate from a resulting signal based on a dither function.

For example, using a dithering process, an in-phase estimate may be expressed by the following equation:

$$\tilde{\phi}_t(T) = \mathrm{argmax}_{t \in [T\text{-}history, T]}(A_i(\epsilon_i(t)))$$ Equation 1 where $\tilde{\phi}_t(T)$ is an in-phase estimate that is a function of a tensor T corresponding to a sensor electrode pattern, $A_i$ is the amplitude of a signal waveform at a sensor pixel i, $\epsilon_i(t)$ is the dither function that describes an amount of noise introduced into a resulting signal or sensing signal as a function of time t, and argmax corresponds an arguments of the maxima function that determines the maximum value of $A_i(\epsilon_i(t))$, i.e., the in-phase estimate of the phase delay. For more information on the tensor T, see Step 420 in FIG. 4 above and the accompanying description.

In Step 630, a quadrature estimate of a phase delay is determined using one or more resulting signals and a dither function in accordance with one or more embodiments. In particular, a quadrature estimate of a phase delay may be expressed using the following equation:

$$\check{\phi}_t(T) = \mathrm{argmin}_{t \in [T\text{-}history, T]}(A_i(\epsilon_i(t)))$$ Equation 2 where $\check{\phi}_t(T)$ is a quadrature phase estimate that is a function of the tensor T corresponding to a sensor electrode pattern, $A_i$ is the amplitude of a sensing waveform at a sensor pixel i, $\epsilon_i(t)$ is the dithering function at the sensor pixel i as a function of time t, and argmin is an arguments of the minimum function that determines a phase estimate of the minimum value of $A_i(\epsilon_i(t))$, i.e., the quadrature phase estimate.

In particular, an incremental step in a dithering process and a direction of the incremental step may be determined from a corresponding numerical sign and absolute value of $(\tilde{\phi}_t(T) - \tilde{\phi}_t(T-\Delta))$ where $\Delta$ is the change in the nodal parameters of the tensor T. In some embodiments, a phase baseline includes a per node history of $(A_i(\epsilon_i(t)), t \in [T\text{-}history, T]$.

In Step 640, a phase baseline estimate is determined using an in-phase estimate of a phase delay and a quadrature estimate of a phase delay in accordance with one or more embodiments.

In Step 650, object information is determined using one or more resulting signals and a phase baseline estimate in accordance with one or more embodiments. For example, the object information may be determined in a similar manner as described above in Step 450 in FIG. 4 and the accompanying description.

Figure 7:
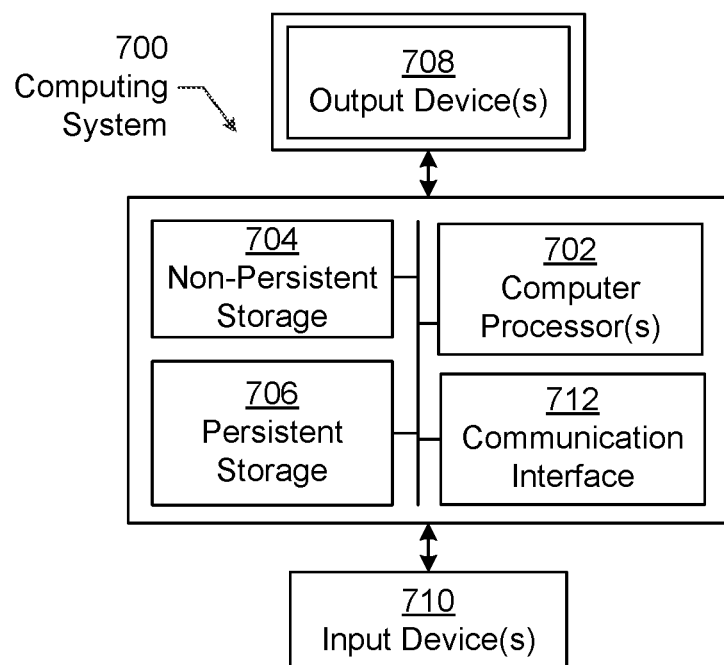
FIG. 7 shows a computing system in accordance with one or more embodiments.

Embodiments may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (700) in FIG. 7. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7, while performing one or more embodiments of the disclosed technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 7 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 7. Other functions may be performed using one or more embodiments of the disclosed technology.

In some embodiments, the disclosed technology relates to an input device. The input device includes various transmitter electrodes that transmit various sensing signals along one or more transmitter electrodes among the transmitter electrodes. The input device further includes various receiver electrodes, where the transmitter electrodes and the receiver electrodes define various sensor pixels within the input device. The input device further includes sensing circuitry coupled to a receiver electrode among the receiver electrodes. The sensing circuitry obtains a first resulting signal and a second resulting signal from the receiver electrode. The input device further includes a first mixer coupled to the sensing circuitry. The first mixer combines the first resulting signal and an in-phase signal to produce an in-phase estimate of a phase delay of a sensor pixel among the sensor pixels. The input device further includes a second mixer coupled to the sensing circuitry. The second mixer combines the second resulting signal and a quadrature signal to produce a quadrature estimate of the phase delay of the sensor pixel. The in-phase estimate and the quadrature estimate determine a phase baseline estimate of the sensor pixels.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. An input device, comprising:
 a plurality of sensor electrodes that define a plurality of sensor pixels, the plurality of sensor electrodes comprising at least one transmitter electrode and a plurality of receiver electrodes, the at least one transmitter electrode configured to be driven with a continuous sensing signal that omits a settling period between temporally adjacent sensing signals; and
 a processing system coupled to the plurality of sensor electrodes, the processing system comprising circuit elements configured to:
  in a first phase detection state:
   obtain a first resulting signal from a first receiver electrode of the plurality of receiver electrodes in response to the continuous sensing signal,
   determine, using the first resulting signal, a first phase baseline estimate at a first sensor pixel among the plurality of sensor pixels,
  in a second phase detection state:
   obtain a second resulting signal from a second receiver electrode of the plurality of receiver electrodes in response to the continuous sensing signal,
   determine, using the second resulting signal, a second phase baseline estimate at a second sensor pixel among the plurality of sensor pixels,
  wherein the circuit elements of the processing system are shared for the processing of the first resulting signal and the second resulting signal, and
  wherein the circuit elements of the processing system are configured differently for the first phase detection state and the second phase detection state.

2. The input device of claim 1, further comprising:
 sensing circuitry coupled to the first receiver electrode and the second receiver electrode, the sensing circuitry configured to obtain the first resulting signal and the second resulting signal; and
 wherein the circuit elements comprise:
  a first mixer coupled to the sensing circuitry, wherein the first mixer is configured to combine the first resulting signal and an in-phase signal to produce the first in-phase estimate of the phase delay; and
  a second mixer coupled to the sensing circuitry, wherein the second mixer is configured to combine the second resulting signal and a quadrature signal to produce the first quadrature estimate of the phase delay.

3. The input device of claim 1,
 wherein the first resulting signal and the second resulting signal corresponds to a capacitive coupling between a transmitter electrode and a receiver electrode at the sensor pixel, and
 wherein the sensor pixel corresponds to a capacitive measurement of a capacitive image for a sensing region.

4. The input device of claim 1, wherein the processing system is further configured to:
 in a capacitive sensing state:
  obtain a third resulting signal from the first of the plurality of receiver electrodes,
  obtain a fourth resulting signal from the second of the plurality of receiver electrodes,
  determine an amplitude of the third resulting signal,
  determine an amplitude of the fourth resulting signal,
  adjust the amplitude of the third resulting signal using the first phase baseline estimate to produce a first adjusted amplitude,
  adjust the amplitude of the fourth resulting signal using the second phase baseline estimate to produce a second adjusted amplitude, and
  determine, based at least in part on the first adjusted amplitude and the second adjusted amplitude, positional information regarding a location of an input object in a sensing region,
  wherein the circuit elements of the processing system are further shared for the processing of the third resulting signal and fourth resulting signal, and
  wherein the circuit elements of the processing system are further configured differently for the capacitive sensing state.

5. The input device of claim 1, wherein the first resulting signal and the second resulting signal are time-sequential signals that are obtained by an analog front-end in the input device.

6. The input device of claim 1, wherein phase baseline estimates for the plurality of sensor pixels are stored in a matrix.

7. A method, comprising:
 transmitting, along at least one transmitter electrode, a continuous sensing signal that omits a settling period temporally adjacent sensing signals;
 operating circuit elements in a first phase detection state to:
  obtain a first resulting signal from a first receiver electrode of a plurality of receiver electrodes in response to the continuous sensing signal;
  determine, using the first resulting signal, a first phase baseline estimate at a first sensor pixel among a plurality of sensor pixels,
  wherein the plurality of sensor pixels is defined by the at least one transmitter electrode and the plurality of receiver electrodes;

operating the circuit elements in a second phase detection state to:
    obtain a second resulting signal from a second receiver electrode of the plurality of receiver electrodes in response to the continuous sensing signal;
    determine, using the second resulting signal, a second phase baseline estimate at a second sensor pixel among the plurality of sensor pixels,
wherein the circuit elements are shared for the processing of the first resulting signal and the second resulting signal, and
wherein the circuit elements are configured differently for the first phase detection state and the second phase detection state.

8. The input device of claim 1, wherein the processing system is configured to:
    determine the first phase baseline estimate during a first portion of a touch frame time, and
    determine the second phase baseline estimate during a second portion of the touch frame time.

9. The method of claim 7, further comprising:
    determining the first phase baseline estimate during a first portion of a touch frame time, and
    determining the second phase baseline estimate during a second portion of the touch frame time.

10. The method of claim 7, further comprising:
operating the circuit elements in a capacitive sensing state to:
    obtain a third resulting signal from the first of the plurality of receiver electrodes,
    obtain a fourth resulting signal from the second of the plurality of receiver electrodes,
    determine an amplitude of the third resulting signal,
    determine an amplitude of the fourth resulting signal,
    adjust the amplitude of the third resulting signal using the first phase baseline estimate to produce a first adjusted amplitude,
    adjust the amplitude of the fourth resulting signal using the second phase baseline estimate to produce a second adjusted amplitude, and
    determine, based at least in part on the first adjusted amplitude and the second adjusted amplitude, positional information regarding a location of an input object in a sensing region,
    wherein the circuit elements of the processing system are further shared for the processing of the third resulting signal and fourth resulting signal, and
wherein the circuit elements of the processing system are further configured differently for the capacitive sensing state.

* * * * *

UNITED STATES PATENT AND TRADEMARK OFFICE
CERTIFICATE OF CORRECTION

PATENT NO. : 10,969,894 B2
APPLICATION NO. : 16/745649
DATED : April 6, 2021
INVENTOR(S) : Petr Shepelev et al.

Page 1 of 1

It is certified that error appears in the above-identified patent and that said Letters Patent is hereby corrected as shown below:

In the Claims

At Column 22, Claim number 7, Line number 4, "... temporally adjacent sensing signals;" should read -- ... between temporally adjacent sensing signals; --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*